(12) United States Patent
Helmig (10) Patent No.: US 12,057,664 B2
(45) Date of Patent: Aug. 6, 2024

(54) HEATING APPARATUS FOR AT LEAST ONE HOUSING SECTION OF A SCREW EXTRUDER AND METHOD FOR SERVICING A HEATING APPARATUS OF THIS KIND

(71) Applicant: Coperion GmbH, Stuttgart (DE)

(72) Inventor: Dieter Helmig, Knittlingen (DE)

(73) Assignee: Coperion GmbH, Stuttgart (DE)

( * ) Notice: Subject to any disclaimer, the term of this patent is extended or adjusted under 35 U.S.C. 154(b) by 833 days.

(21) Appl. No.: 17/068,035

(22) Filed: Oct. 12, 2020

(65) Prior Publication Data

US 2021/0111522 A1 Apr. 15, 2021

(30) Foreign Application Priority Data

Oct. 11, 2019 (DE) ................. 10 2019 215 700.9

(51) Int. Cl.
*H01R 13/66* (2006.01)
*B29C 48/80* (2019.01)
(Continued)

(52) U.S. Cl.
CPC ....... *H01R 13/6675* (2013.01); *B29C 48/832* (2019.02); *H05B 1/023* (2013.01); *H05B 3/06* (2013.01)

(58) Field of Classification Search
CPC ...... H05B 2203/014; H05B 3/48; H05B 3/06; H05B 3/44; H05B 1/0236; H05B 2203/019; H05B 2203/02; H05B 3/03; H05B 2203/012; H05B 2203/016; H05B 2203/017; H05B 3/0014; H05B 3/08; H05B 3/42; H05B 3/50; H05B 3/52; H05B 1/023; H05B 1/02; H05B 3/02; H05B 3/40; H05B 3/46; H05B 6/06; H01R 2103/00; H01R 24/38; H01R 4/18; H01R 43/02;
(Continued)

(56) References Cited

U.S. PATENT DOCUMENTS 4,352,976 A * 10/1982 McMullan ............... H05B 3/18
219/217
2011/0269084 A1 11/2011 Ito

FOREIGN PATENT DOCUMENTS

AT 006 979 U2 6/2004
CN 102 275 283 A 12/2011
(Continued)

OTHER PUBLICATIONS

Knoll, DE 4404031 C1 (Year: 1995).*
(Continued)

*Primary Examiner* — Vy T Nguyen
(74) *Attorney, Agent, or Firm* — Dinsmore & Shohl LLP (57) ABSTRACT

A heating apparatus for at least one housing section of a screw extruder comprises at least two heating elements which are connected to contact plugs via connection lines. For the purpose of supplying power, the heating apparatus comprises an electrical supply line which is connected to a plug-in contact distributor. The plug-in contact distributor comprises at least two plug-in contacts. The contact plugs are releasably connected to the plug-in contacts. The heating apparatus renders possible simple exchange of a heating element and is therefore easy to service. The modular construction of the heating apparatus renders possible flexible use.

26 Claims, 8 Drawing Sheets

(51) Int. Cl.
  *H05B 1/02* (2006.01)
  *H05B 3/06* (2006.01)
(58) Field of Classification Search
  CPC ...... H01R 43/048; H01R 43/16; H01R 43/24; H01R 13/6675
  USPC ........................................ 219/544, 541, 546
  See application file for complete search history.

(56) References Cited

FOREIGN PATENT DOCUMENTS

| | | |
|---|---|---|
| DE | 10 2006 022 646 A1 | 11/2007 |
| DE | 20 2010 006 265 U1 | 8/2010 |
| DE | 10 2017 002830 A1 | 7/2018 |
| EP | 2444228 A1 | 4/2012 |
| JP | H09029807 A | 2/1997 |
| JP | 2011230381 A | 11/2011 |
| WO | 2015031720 A1 | 3/2015 |

OTHER PUBLICATIONS

Martin, CH 710723 A2 (Year: 2016).*
DE 10 2019 215 700.9 International Search Report, Jun. 12, 2020.
CN 2020 1108 6865.6 Office Action dated Mar. 7, 2022.
Chinese Office Action for Chinese Appln. No. 202011086865.6, 14 pages.
JP 2020-165356 Office Action—Notice of Refusal dated Sep. 22, 2021.
EP 20 191 700.2, European Search Report, Mar. 2, 2021.

* cited by examiner

HEATING APPARATUS FOR AT LEAST ONE HOUSING SECTION OF A SCREW EXTRUDER AND METHOD FOR SERVICING A HEATING APPARATUS OF THIS KIND

CROSS-REFERENCES TO RELATED APPLICATIONS

This application claims the priority of German Patent Application, Serial No. 10 2019 215 700.9, filed Oct. 11, 2019, the content of which is incorporated herein by reference in its entirety as if fully set forth herein.

FIELD OF THE INVENTION

The invention relates to a heating apparatus for at least one housing section of a screw extruder and to a screw extruder comprising a heating apparatus of this kind. The invention further relates to a method for servicing a heating apparatus of this kind.

BACKGROUND OF THE INVENTION

DE 10 2006 022 646 A1 discloses an extruder comprising a housing which is constructed from a plurality of housing sections. Associated electrical heating apparatuses are arranged on the housing sections. The respective heating apparatus comprises electrical heating elements in the form of resistance heating cartridges which are arranged in passage bores of the housing section. The heating conductors of the heating elements are guided into a liquid-tight connection housing and merged there at a terminal strip. The connection housing further comprises a connection means for a power line which is contact-connected to the terminal strip via a contact line.

SUMMARY OF THE INVENTION

The invention is based on an object of providing a heating apparatus for at least one housing section of a screw extruder, which heating apparatus can be used in a flexible manner and is easy to service.

This object is achieved by a heating apparatus for at least one housing section of a screw extruder, comprising
- at least two electrical heating elements,
- at least two electrical connection lines which are each connected to one of the at least two electrical heating elements,
- an electrical supply line for supplying power to the at least two electrical heating elements via the at least two connection lines, wherein the supply line is connected to a plug-in contact distributor, wherein the plug-in contact distributor comprises at least two plug-in contacts, and wherein the at least two connection lines are each connected to one of the at least two plug-in contacts by means of a contact plug.

Since the respective connection line is connected to an associated contact plug which can be electrically conductively connected to an associated plug-in contact of a plug-in contact distributor in a simple manner, the respective electrical heating element can be individually connected to a power supply and disconnected again. The at least two contact plugs and the at least two plug-in contacts are each mechanically and/or electrically connected to one another in a reversible manner, that is to say can be released again. The at least two contact plugs and/or the at least two plug-in contacts are in particular arranged in an accessible manner, preferably in a freely accessible manner. Servicing of the heating apparatus is simple since a defective electrical heating element can be individually electrically disconnected from the plug-in contact distributor and replaced by a functional electrical heating element. This can be done by any operator. A trained electrician is not required to exchange a defective heating element.

Owing to the modular construction, it is in particular not necessary to disassemble the entire heating apparatus from the associated housing section in order to exchange a defective heating element and to open a connection housing for the purpose of electrical disconnection, for which a trained electrician is generally required.

The respective heating element is mechanically and/or electrically connected to the associated connection line for example by means of a screw connection, a plug-in connection or a fixed connection. The plug-in connection is designed for example as an angled block and can be released only using a removal tool. The respective heating element and the associated connection line are preferably fixedly, that is to say mechanically and electrically non-releasably, connected to one another. The at least two heating elements are designed for example as electrical resistance heating elements or resistance heating cartridges. The at least two connection lines each have a length L, wherein preferably: 0.5 m≤L≤5 m, in particular 1.0 m≤L≤4 m, in particular 1.5 m≤L≤3 m. Owing to the length L, the plug-in contact distributor can be arranged at a distance from the at least two heating elements as required.

The supply line is releasably, for example by means of a screw connection or plug-in connection, or fixedly mechanically and/or electrically connected to the plug-in contact distributor. If the supply line is releasably connected to the plug-in contact distributor, the plug-in contact distributor preferably has two supply line connections. As a result, the supply line of a further heating apparatus can be connected to the plug-in contact distributor, so that the plug-in contact distributors are connected in series by means of the supply lines and in this way the power supply is further guided from heating apparatus to heating apparatus.

The plug-in contact distributor is connected to a power supply via the supply line and in particular can be disconnected from the power supply in a simple manner, for example by way of a supply line contact plug being unplugged.

Owing to the modular construction, the at least two electrical heating elements can be selected in a flexible manner as desired and assembled to form the heating apparatus.

A heating apparatus, in which the at least two connection lines are of flexible design, ensures flexible use and easy servicing. On account of the at least two connection lines being of flexible, in particular pliable, design, simple line guidance of the at least two connection lines and simple assembly and disassembly of the associated heating elements are rendered possible. Proceeding from the respective electrical heating element, the associated connection line can be guided to the plug-in contact distributor as desired.

A heating apparatus, in which the at least two connection lines are fixedly connected to the associated contact plugs, ensures flexible use and easy servicing. Owing to the fixed, that is to say non-releasable, mechanical and electrical connection between the respective connection line and the associated contact plug, a high level of personal protection is ensured, so that the respective heating element can also be exchanged by any operator in a simple manner. Therefore, a trained electrician is not required. The respective heating element forms, in particular together with the associated connection line and the associated contact plug, a heating unit which forms an exchangeable module of the heating apparatus.

A heating apparatus, in which the plug-in contact distributor comprises at least four, in particular at least six, and in particular at least eight, plug-in contacts, ensures flexible use and easy servicing. Owing to the number of plug-in contacts, the construction of the heating apparatus can be adapted or optimized as desired. If the plug-in contact distributor has, for example, eight plug-in contacts, either one housing section with eight heating elements or two housing sections with four heating elements each can be heated. The number of plug-in contact distributors can be optimized by the number of plug-in contacts.

A heating apparatus, in which the electrical supply line is fixedly connected to the plug-in contact distributor, ensures flexible use and easy servicing. The fixed, that is to say non-releasable, mechanical and electrical connection between the supply line and the plug-in contact distributor ensures a high level of personal protection. Owing to the fixed connection of the electrical supply line to the plug-in contact distributor and possibly to a supply line contact plug, these form a supply unit. The respective supply unit forms a module of the heating apparatus.

A heating apparatus, in which the electrical supply line is of flexible design, ensures flexible use and easy servicing. Since the electrical supply line is flexible, in particular pliable, simple line guidance and flexible arrangement of the associated plug-in contact distributor are possible.

A heating apparatus, in which the at least two plug-in contacts and the respectively associated contact plugs are mechanically and electrically connected to one another, ensures flexible use and easy servicing. Since the respective plug-in contact and the associated contact plug can be mechanically and electrically conductively connected to one another and released again, simple assembly and disassembly of the associated heating element is possible. As a result, the heating elements can be exchanged by any operator in a simple manner and as required. In particular, a trained electrician is not required in order to exchange a heating element. The heating element can be mechanically and electrically disconnected by an operator in a simple manner by unplugging the contact plug from the plug-in contact. The operator can then mechanically and electrically conductively connect a heating element to the plug-in contact distributor again by plugging the associated contact plug into the plug-in contact. The heating elements can therefore be disconnected from the energy supply and connected again in a simple manner.

A heating apparatus, in which the plug-in contact distributor and the supply line form a supply unit, ensures flexible use and easy servicing. The supply unit forms a module of the heating apparatus, which module can be exchanged in a simple manner. In order to form the supply unit, the plug-in contact distributor is preferably fixedly and/or releasably connected to the associated supply line and/or the supply line is fixedly connected to an associated supply line contact plug. The supply unit is designed for a rated voltage of at least 200 V, in particular of at least 380 V, and in particular of at least 460 V. The rated voltage preferably lies between 200 V and 480 V.

A heating apparatus, in which the respective electrical heating element together with the associated electrical connection line and the associated contact plug form a heating unit, ensures flexible use and easy servicing. The respective heating unit forms a module of the heating apparatus, which module can be exchanged in a simple manner. At least two, in particular at least three, and in particular at least four, heating units are preferably associated with a supply unit. The at least two heating units which are associated with a supply unit are of identical and/or different design. For example, the at least two heating units can have an identical nominal heating capacity and/or different nominal heating capacities. The respective heating unit is designed for a rated voltage of at least 200 V, in particular of at least 380 V, and in particular of at least 460 V. The rated voltage preferably lies between 200 V and 480 V.

A heating apparatus, in which the plug-in contact distributor (26) and/or the respective contact plug and/or the supply unit and/or the respective heating unit are/is at least of protection class IP54, in particular at least of protection class IP64, and in particular of protection class IP67, ensures flexible use and easy servicing. The protection class ensures a high level of personal protection. In particular, standard DIN EN 60529 applies to the protection class. In particular, the protection class ensures that a component and/or a module of the heating apparatus can be exchanged by any operator. A trained electrician is not required for exchange purposes.

A heating apparatus comprising at least one switching element for switching at least one electrical heating element ensures flexible use and easy servicing. The at least one switching element is preferably part of the supply unit and/or the respective heating unit. The at least one switching element is preferably integrated into the plug-in contact distributor. The heating apparatus comprises, for example, an associated switching element for each plug-in contact and/or for each electrical heating element, so that the respective heating element can be individually switched on and switched off, and/or comprises an associated switching element for a plurality of plug-in contacts and/or for a plurality of electrical heating elements, so that the plurality of heating elements can be jointly switched on and switched off. The at least one switching element is designed, in particular, as an active switching element, for example as a solid-state relay. The at least one switching element is preferably supplied with electrical power via the electrical supply line.

A heating apparatus, in which the at least one switching element is connected to at least one data bus connection, ensures flexible use and easy servicing. Owing to the at least one data bus connection, the respective switching element can be actuated by means of a data bus. As a result, in particular all of the switching elements can be actuated by means of a data bus or a data bus line. The data bus line connects in particular all of the switching elements to one another. The data bus is designed for example as a field bus. The plug-in contact distributors of a plurality of heating apparatuses are preferably connected in series by means of a data bus line, so that switching elements which are integrated into the plug-in contact distributors can be actuated by means of the data bus line or the data bus. The at least one switching element is connected to the data bus line by means of a penetrating contact in particular. When it is clamped to the data bus line, a penetrating contact penetrates the outer casing of the data bus line and forms a contact for data transmission.

A heating apparatus comprising at least one measurement sensor for monitoring at least one electrical heating element ensures flexible use and easy servicing. Owing to the at least one measurement sensor, the current which is consumed by the at least one heating element can be measured and monitored for example. Deviations from a target current consumption can be established by measuring and monitoring the current consumption. As a result, failure of a heating element can be identified at an early stage. The at least one measurement sensor is designed, in particular, as a current measurement sensor. The at least one measurement sensor is preferably integrated into an associated switching element. The at least one switching element preferably renders possible monitoring in respect of whether a heating element is connected and functional.

A heating apparatus, in which the plug-in contact distributor comprises at least one supply line connection, in particular two supply line connections, ensures flexible use and easy servicing. Owing to the at least one supply line connection, the supply line of a further heating apparatus can be connected to the plug-in contact distributor, so that the plug-in contact distributors can be connected in series by means of the supply lines and the power supply can be guided from heating apparatus to heating apparatus in this way. The supply line which is associated with the plug-in contact distributor is releasably or fixedly connected to the plug-in contact distributor. The respective plug-in contact distributor preferably has two supply line connections, so that its own supply line and the supply line of a further heating apparatus can be releasably connected to the plug-in contact distributor. As a result, expenditure on cabling can be optimized in a simple manner.

The invention is further based on an object of providing a screw extruder comprising at least one heating apparatus for at least one housing section, which screw extruder can be used in a flexible manner and is easy to service.

This object is achieved by a screw extruder comprising
a housing having at least two housing sections,
at least one housing bore which is formed in the housing,
at least one treatment element shaft which is rotatably arranged in the housing bore, and
at least one heating apparatus according to the invention, wherein the at least two electrical heating elements are arranged in receiving recesses of at least one of the housing sections.

The advantages of the screw extruder according to the invention correspond to the above-described advantages of the heating apparatus according to the invention. The screw extruder is preferably a multiple-shaft screw extruder, in particular a twin-shaft screw extruder. The multiple-shaft screw extruder comprises at least two housing bores which penetrate one another and in which in each case one treatment element shaft is rotatably arranged. The at least two treatment element shafts are preferably designed such that they can be driven in rotation in identical rotation directions and/or such that they tightly mesh with one another. The screw extruder preferably has a plurality of heating apparatuses. The heating apparatuses can be of identical and/or different construction. The heating apparatuses can differ, for example, in respect of the number of heating elements and/or in respect of the nominal heating capacity.

The screw extruder is, for example, part of an apparatus for processing material. The apparatus comprises a lower frame on which the screw extruder is arranged. The apparatus preferably comprises an electric drive motor and a gear mechanism which are arranged on the lower frame. The plug-in contact distributor, in particular the supply unit, of the at least one heating apparatus is preferably arranged on the lower frame, in particular at a distance from the screw extruder. For example, a line duct can be arranged and/or formed on the lower frame. The supply unit is arranged, in particular, on the line duct and/or in the line duct.

A screw extruder, in which at least one thermally insulating hood is arranged on at least one of the housing sections, ensures flexible use and easy servicing of the at least one heating apparatus. Since the at least two electrical heating elements are connected to the plug-in contact distributor via the associated connection lines and contact plugs, the plug-in contact distributor can firstly be arranged spatially at a distance from the at least one housing section and secondly the connection lines can be guided as desired, so that neither the plug-in contact distributor nor the connection lines or the heating elements obstruct the arrangement of the at least one thermally insulating hood. The disassembly of the at least one thermally insulating hood is readily possible since the at least one heating apparatus or a component of the at least one heating apparatus does not have to be disassembled for this purpose. After disassembly of the at least one thermally insulating hood, the at least one heating apparatus is freely accessible, so that the at least one heating apparatus can be maintained and serviced as required. In particular, a defective heating element can be exchanged in a simple manner.

A screw extruder, in which the at least one thermally insulating hood is of U-shaped and/or one-piece design, ensures flexible use and easy servicing of the at least one heating apparatus. Since the at least one heating apparatus does not adversely affect the construction and the arrangement of the at least one thermally insulating hood, the at least one thermally insulating hood can be of U-shaped and/or one-piece design. As a result, the at least one thermally insulating hood can be used in a simple manner in conjunction with the at least one heating apparatus. In particular, the at least one thermally insulating hood can be disassembled as a whole in a simple manner, so that the at least one heating apparatus is freely accessible for maintenance or servicing.

A screw extruder, in which a gap is formed between the at least one thermally insulating hood and the housing, wherein the at least two connection lines are guided to the plug-in contact distributor through the gap, ensures flexible use and easy servicing of the at least one heating apparatus. Since a gap is formed between the at least one thermally insulating hood and the housing, the at least two connection lines can be guided from the associated heating elements, through the gap, to the associated plug-in contact distributor in a simple manner. The arrangement of the at least one thermally insulating hood is therefore not adversely affected by the at least one heating apparatus, so that the at least one heating apparatus can be used in a simple and flexible manner in conjunction with the at least one thermally insulating hood. The at least one thermally insulating hood can be disassembled in a simple manner, in particular by being lifted away, so that the at least one heating apparatus is freely accessible for maintenance or servicing.

The invention is further based on an object of providing a method for easy servicing of a heating apparatus for at least one housing section of a screw extruder.

This object is achieved by a method for servicing a heating apparatus, comprising the steps of:
providing a heating apparatus according to the invention,
disconnecting the contact plug which is associated with a first heating element from the plug-in contact of the plug-in contact distributor,
replacing the first heating element with a second heating element, and
connecting the contact plug which is associated with the second heating element to a plug-in contact of the plug-in contact distributor.

The method according to the invention can also comprise, in particular, the step of providing a screw extruder according to the invention. The advantages of the method according to the invention correspond to the above-described advantages of the heating apparatus according to the invention and of the screw extruder according to the invention.

Further features, advantages and details of the invention can be found in the following description of a plurality of exemplary embodiments.

DESCRIPTION OF THE PREFERRED EMBODIMENTS

A first exemplary embodiment of the invention is described below with reference to FIGS. 1 to 5. An apparatus 1, illustrated in FIG. 1, for processing material, in particular plastics material, comprises a multiple-shaft screw extruder 2 which can be rotationally driven by a drive motor 3 by means of a gear mechanism 4. The multiple-shaft screw extruder 2, the drive motor 3 and the gear mechanism 4 are mounted on a lower frame 5. Here, the multiple-shaft screw extruder 2 is supported on the lower frame 5 by means of support pieces 6.

Figure 1:
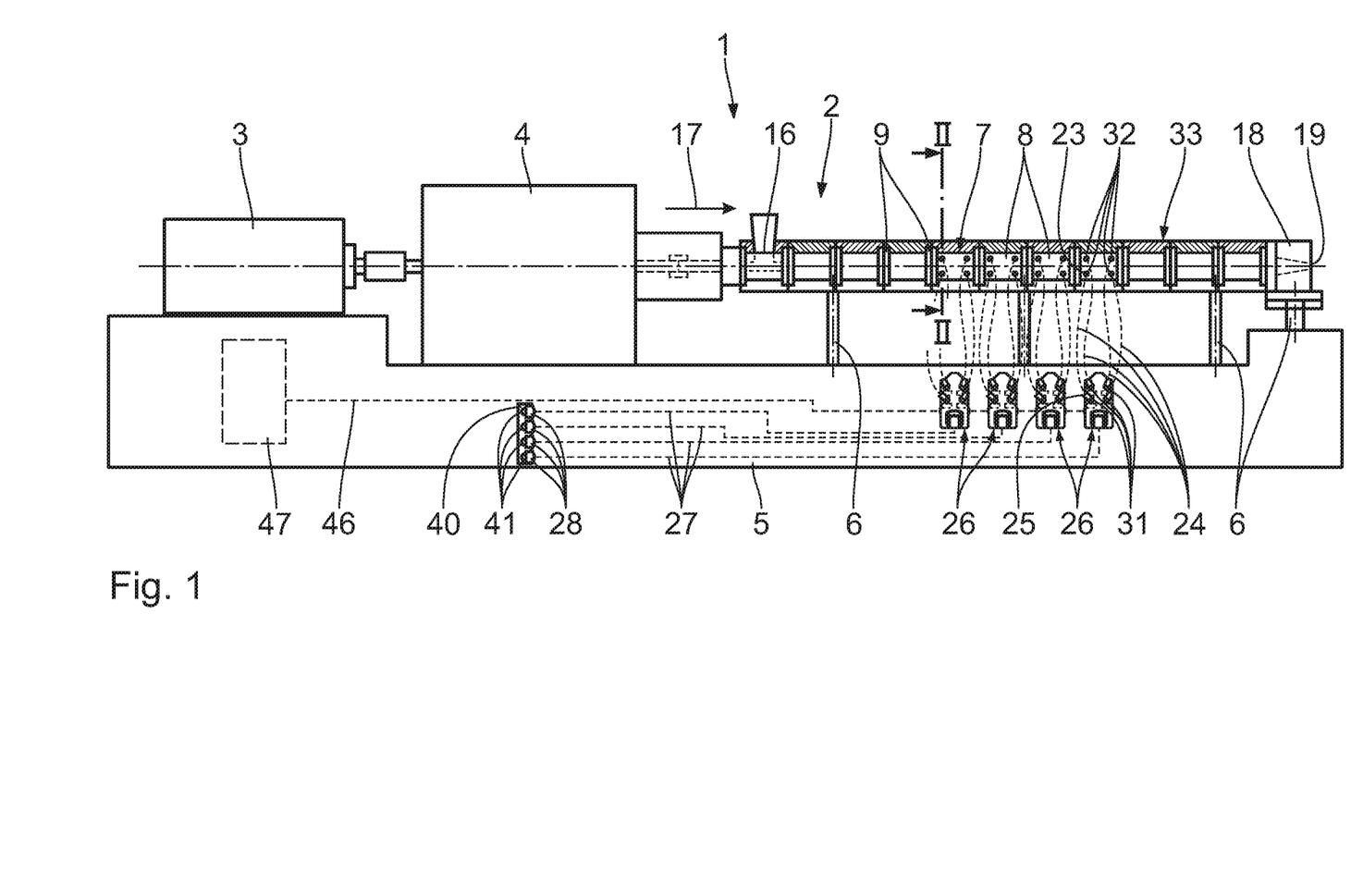
FIG. 1 shows a side view of a multiple-shaft screw extruder according to a first exemplary embodiment comprising a housing, which is formed from a plurality of housing sections, and heating apparatuses for heating housing sections.

The multiple-shaft screw extruder 2 comprises a housing 7 which is constructed from a plurality of housing sections 8 which are connected to one another by means of flanges 9. The housing 7 has two housing bores 10, 11 which penetrate one another and which are in the form of a horizontal eight in cross section. Two treatment element shafts 12, 13 which are designed such that they tightly mesh with one another and which can be rotationally driven about associated rotation axes 14, 15 in identical rotation directions are arranged in the housing bores 10, 11.

A supply opening 16 is formed in the first housing section 8 for the purpose of supplying the material to be processed into the housing bores 10, 11. The material is transported and processed by means of the treatment element shafts 12, 13 in a conveying direction 17. The processed material is discharged through a discharge opening 19 which is formed in a nozzle plate 18. The nozzle plate 18 is mounted on the end side of the last housing section 8.

The multiple-shaft screw extruder 2 comprises a respective electrical heating apparatus 20 for at least individual housing sections 8. The heating apparatuses 20 are of identical design, and therefore only one of the heating apparatuses 20 is described below.

Figure 2:
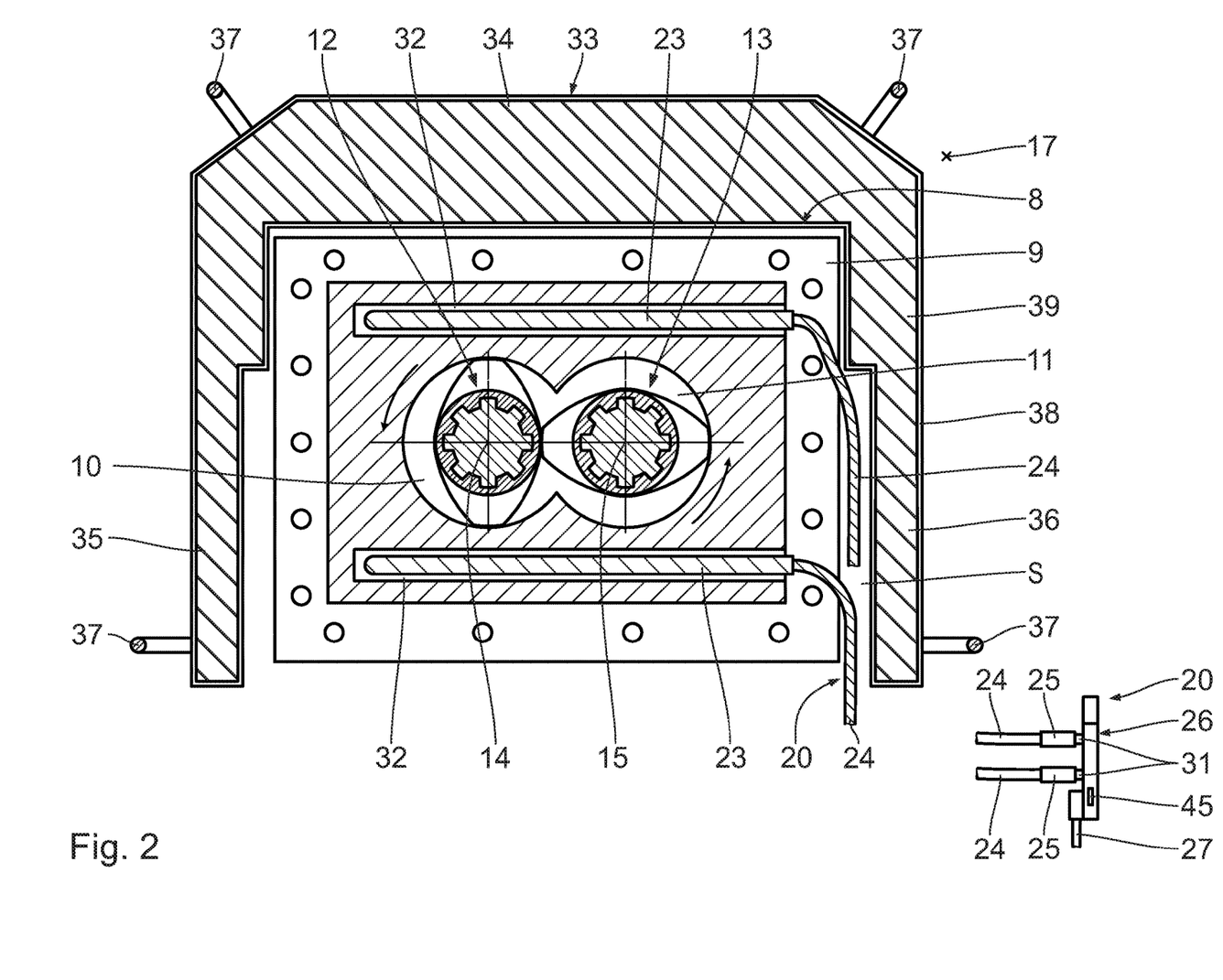
FIG. 2 shows a partially sectioned view through the multiple-shaft screw extruder along section line II-II in FIG. 1 for illustrating a heating apparatus.
Figure 5:
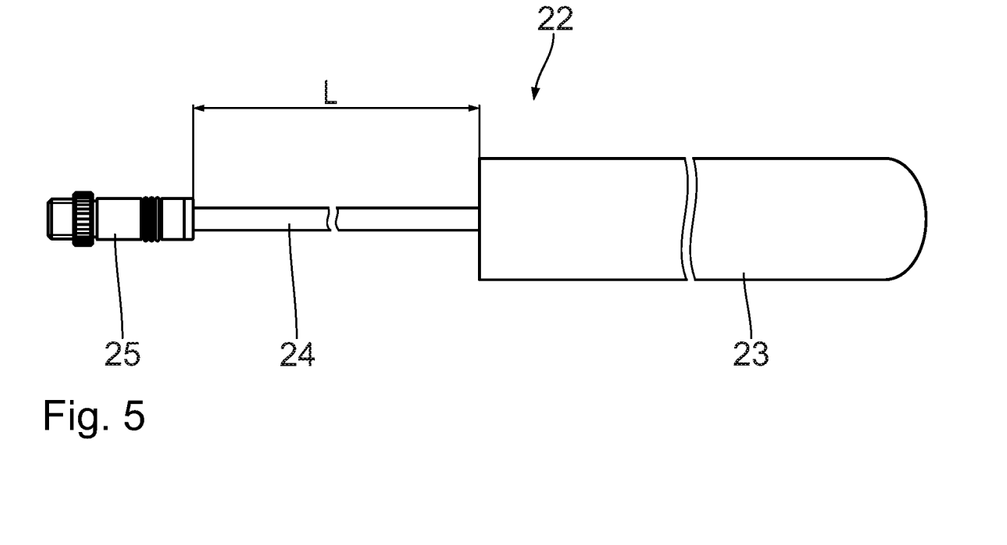
FIG. 5 shows a plan view of a heating unit of the heating apparatus in FIG. 2.

The heating apparatus 20 comprises a supply unit 21 and four associated heating units 22. The heating units 22 are of identical design. The heating units 22 each comprise an electrical heating element 23 which is mechanically and electrically connected to a contact plug 25 via a connection line 24. The respective connection line 24 is fixedly, that is to say mechanically and electrically non-releasably, connected to the associated heating element 23 and the associated contact plug 25. Therefore, the respective connection line 24 cannot be disconnected from the heating element 23 and the contact plug 25 without being destroyed. The respective connection line 24 is of flexible, that is to say pliable, design. The respective heating element 23 is designed, for example, as an electrical resistance heating cartridge.

Figure 4:
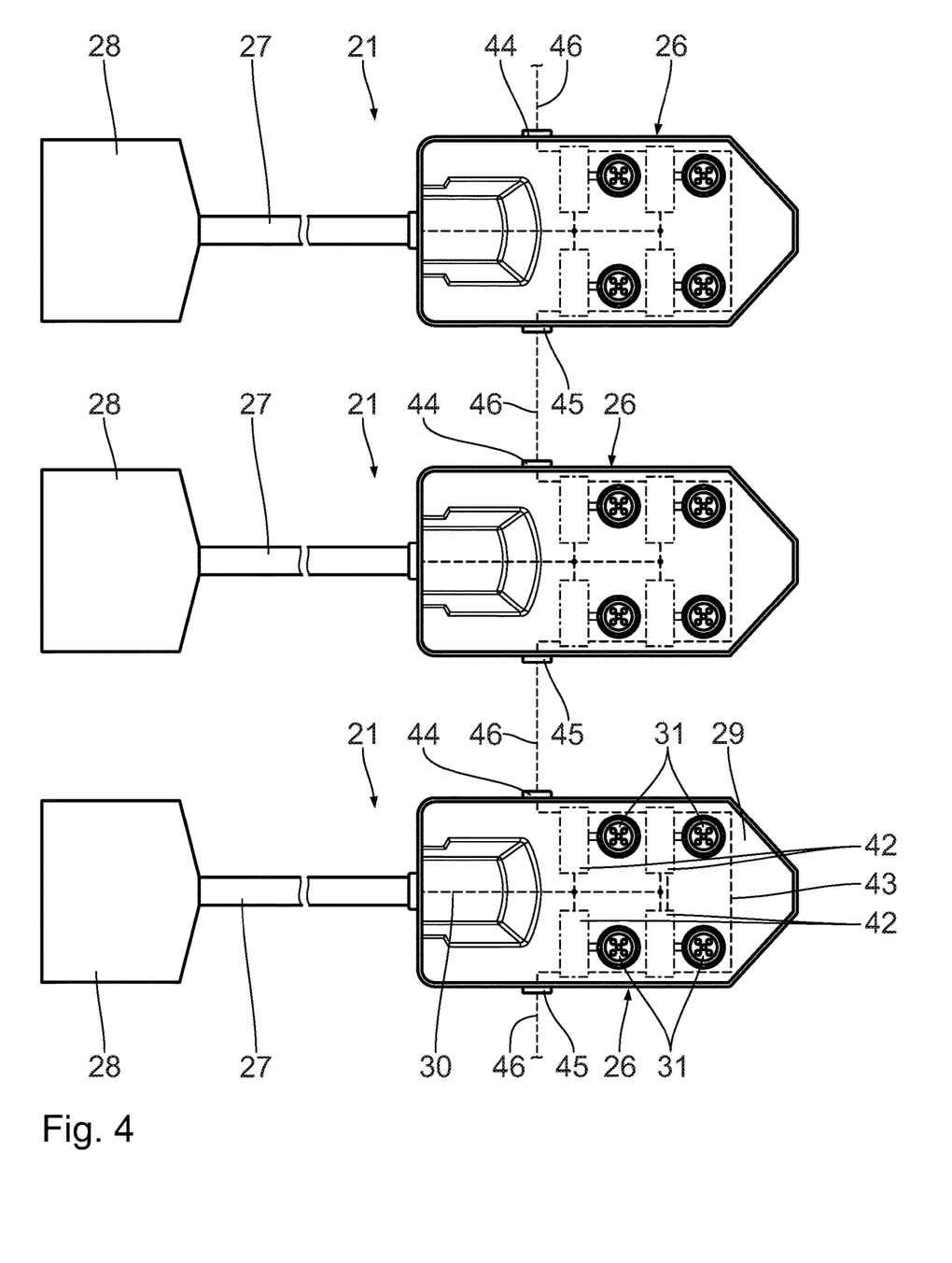
FIG. 4 shows a plan view of a supply unit of the heating apparatus in FIG. 2, which supply unit is connected to further supply units.

The heating units 22 are connected to the supply unit 21. The supply unit 21 comprises a plug-in contact distributor 26, an electrical supply line 27 and a supply line contact plug 28. The supply line 27 is mechanically and electrically connected to the plug-in contact distributor 26 and the supply line contact plug 28. The supply line 27 is of flexible, that is to say pliable, design. The supply line 27 is fixedly, that is to say mechanically and electrically non-releasably, connected to the plug-in contact distributor 26 and the supply line contact plug 28. Therefore, the supply line 27 cannot be disconnected from the plug-in contact distributor 26 and the supply line contact plug 28 without being destroyed.

The plug-in contact distributor 26 comprises a plug-in contact distributor housing 29 in which an electrically conductive distributor element 30 is arranged. The distributor element 30 is electrically conductively connected to the supply line 27. Furthermore, the distributor element 30 is electrically conductively connected to four plug-in contacts 31 via respective switching elements 42. The plug-in contacts 31 are arranged on an outer side of the plug-in contact distributor housing 29 and are therefore freely accessible.

The switching elements 42 allow the power supply to the associated plug-in contacts 31 to be switched on and switched off. To this end, the switching elements 42 are connected to a data bus line 43 which is integrated in the plug-in contact distributor 26. The data bus line 43 is connected to data bus connections 44, 45.

Each of the heating units 22 is plugged into one of the plug-in contacts 31 by way of the associated contact plug 25. The respective contact plug 25 is mechanically and electrically conductively connected to the associated plug-in contact 31 by being plugged in.

The supply unit 21 and the heating units 22 are at least of protection class IP54, in particular of at least protection class IP64, and in particular of protection class IP67. In particular, the plug-in contact distributor 26 or the plug-in contacts 31 and the associated contact plugs 25 for forming the plug-in contact connection are of the mentioned protection class.

In order to receive the heating elements 23, the associated housing section 8 has receiving recesses 32. The receiving recesses 32 are formed between the flanges 9 and run substantially perpendicularly to the housing bores 10, 11. The number of receiving recesses 32 corresponds to the provided number of heating elements 23 of the heating apparatus 20. The housing section 8 has, for example, four receiving recesses 32, wherein two receiving recesses 32 are arranged in a manner spaced apart from one another above the housing bores 10, 11 and in the conveying direction 17, and two receiving recesses 32 are arranged in a manner spaced apart from one another below the housing bores 10, 11 and in the conveying direction 17. The heating elements 23 are plugged into the associated receiving recesses 32 and mounted on the housing section 8.

The multiple-shaft screw extruder 2 has thermally insulating hoods 33 for thermal insulation purposes. The thermally insulating hoods 33 are illustrated in section in FIG. 1. One of the thermally insulating hoods 33 is illustrated in detail in FIGS. 2 and 3. One thermally insulating hood 33 is associated with each housing section 8.

Figure 3:
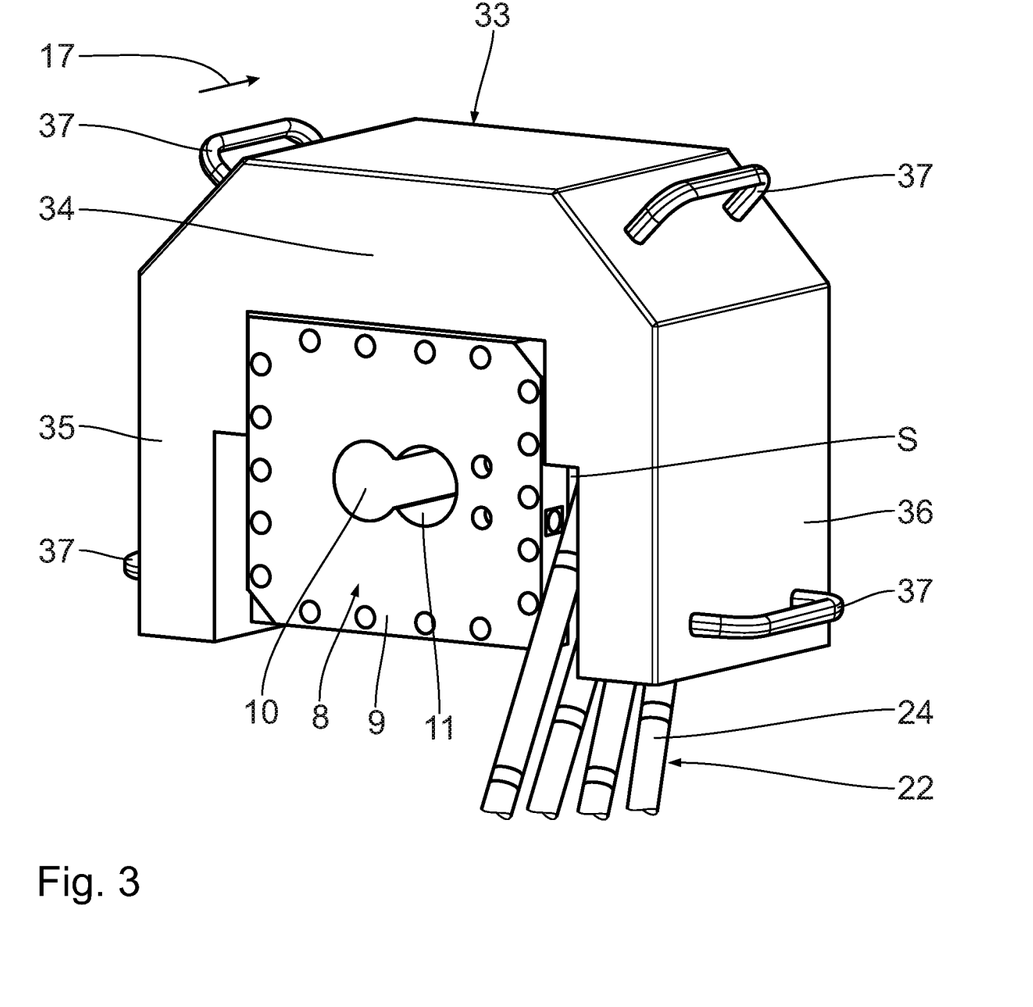
FIG. 3 shows a perspective illustration of an individual housing section comprising a heating apparatus and a thermally insulating hood.

The respective thermally insulating hood 33 is of U-shaped design in cross section and has a base 34 and two limbs 35, 36 which are arranged on the base 34. The respective thermally insulating hood 33 is of one-piece design, so that this can be fitted or attached and disassembled or lifted away as a whole by means of handles 37. The respective thermally insulating hood 33 comprises an outer casing 38 which delimits an interior space. An insulating material 39 is arranged in the interior space. The outer casing 38 is composed, for example, of a metal material.

A gap S is formed between the limbs 35, 36 and the respective housing section 8. The limbs 35, 36 have a recessed section, so that the gap S is increased in size in the region of the recessed sections. The connection lines 24 of the heating elements 23 are guided in the direction of the lower frame 5 through the gap S. The supply unit 21 which is associated with the heating units 22 is arranged at a distance from the housing 7. To this end, the connection lines 24 have a length L, wherein preferably: 0.5 m≤L≤5 m, in particular 1.0 m≤L≤4 m, in particular 1.5 m≤L≤3 m.

The plug-in contact distributor 26 of the respective supply unit 21 is mounted on the lower frame 5. Starting from the respective plug-in contact distributor 26, the associated supply line 27 runs along the lower frame 5, for example in a line duct, to a central power supply 40 with power supply connections 41. The respective supply line contact plug 28 is mechanically and electrically conductively connected to a power supply connection 41 for power supply purposes.

A data bus line 46, which is connected to a control unit 47, is connected to the data bus connection 44 for actuating the switching elements 42. The data bus line 46 can be guided to a further plug-in contact distributor 26 by means of the data bus connection 45. The switching elements 42 can be individually actuated via the data bus line 46, so that the heating elements 23 which are connected to the plug-in contacts 31 can be individually switched on and switched off.

Servicing of one of the heating apparatuses 20 in the event of a defective heating element 23 is described below:

For the purpose of exchanging the defective first heating element 23, the associated supply line contact plug 28 is firstly mechanically and electrically disconnected from the power supply connection 41. The thermally insulating hood 33 which covers the first heating element 23 is then removed from the housing section 8. The first heating element 23 is now freely accessible. The contact plug 25 which is associated with the first heating element 23 is mechanically and electrically disconnected from the associated plug-in contact 31. The first heating element 23 is detached from the housing section 8 and removed from the receiving recess 32. The heating unit 22 with the defective heating element 23 is now replaced by a corresponding heating unit 22 with an intact second heating element 23. The second heating element 23 is inserted into the receiving recess 32 and mounted on the housing section 8. The contact plug 25 which is associated with the second heating element 23 is then mechanically and electrically conductively connected to the free plug-in contact 31. The thermally insulating hood 33 is now arranged on the housing section 8 again. The supply line contact plug 28 is then mechanically and electrically conductively connected to the power supply connection 41 again.

Owing to the design according to the invention of the heating apparatuses 20, heating elements 23 can be individually exchanged. Exchange can be performed by any operator. A trained electrician is not required for exchange purposes. Owing to the modular construction of the heating apparatuses 20, said heating apparatuses can be used in a flexible manner.

The respective plug-in contact distributor 26 can have a number N of plug-in contacts 31, wherein preferably: 4≤N≤8. Heating units 23 for one housing section 8 or a plurality of housing sections 8 can be connected to a plug-in contact distributor 26.

Figure 6:
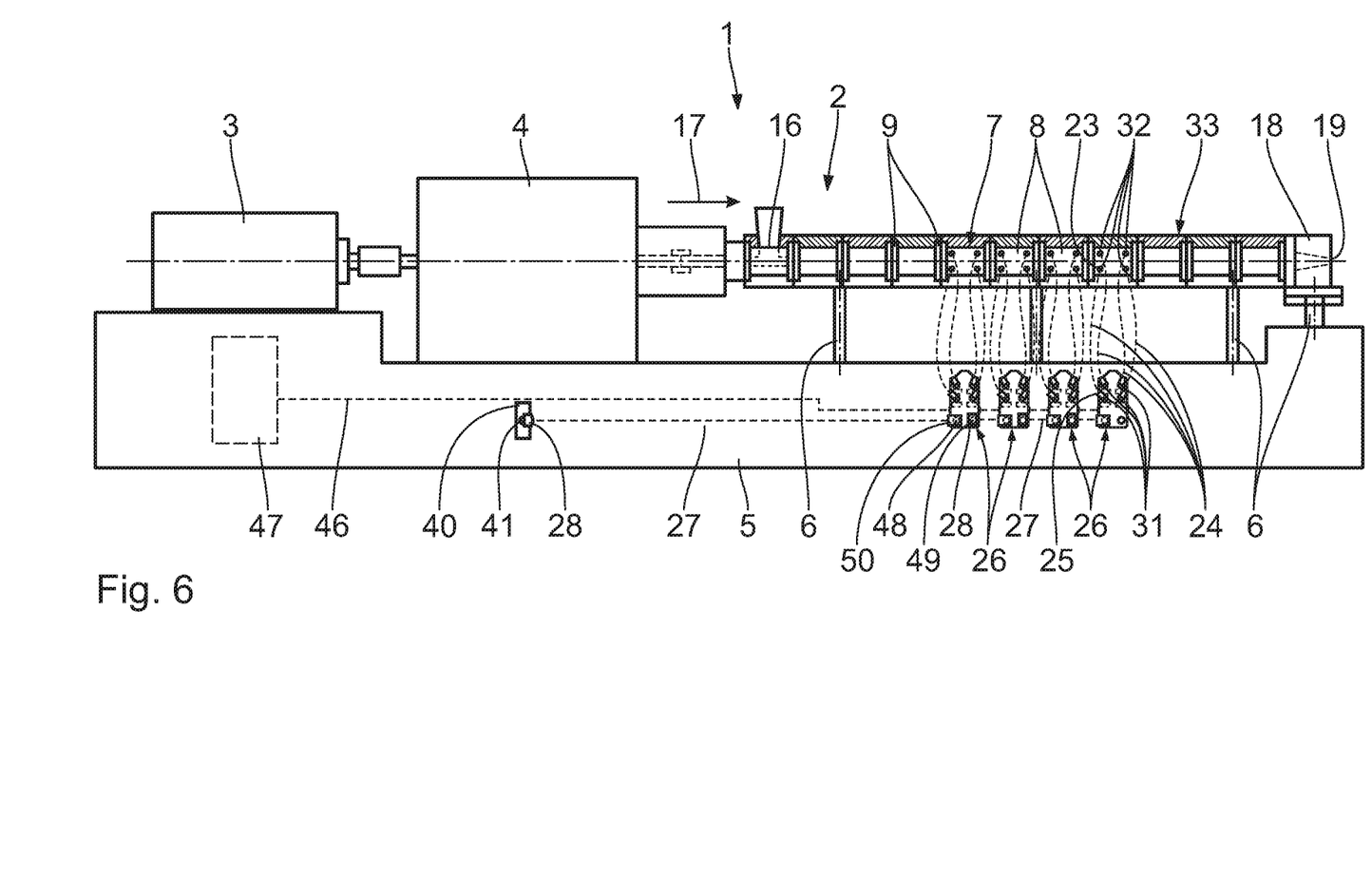
FIG. 6 shows a side view of a multiple-shaft screw extruder according to a second exemplary embodiment.
Figure 7:
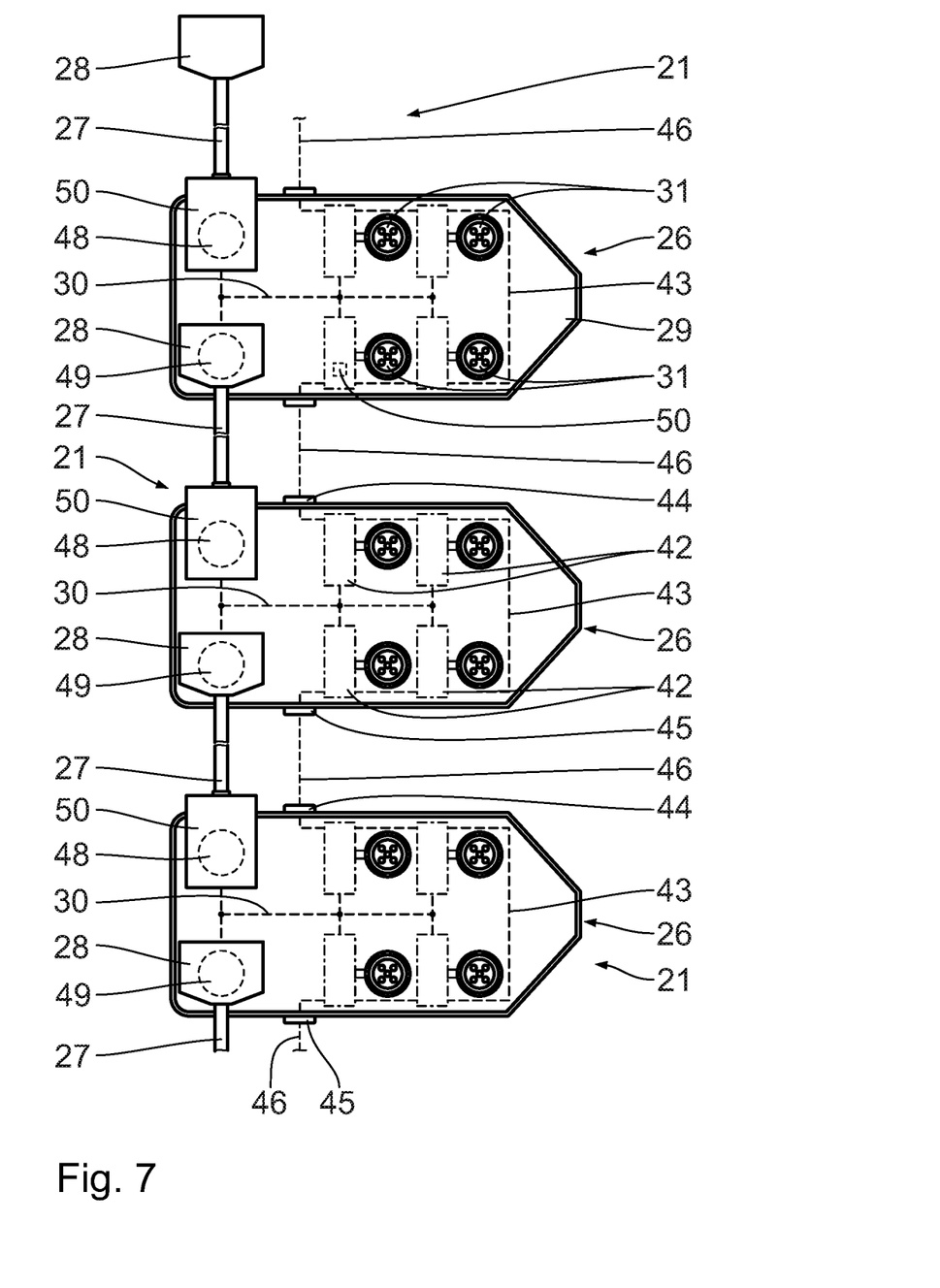
FIG. 7 shows a plan view of a supply unit of the heating apparatus in FIG. 6, which supply unit is connected to further supply units.

A second exemplary embodiment of the invention is described below with reference to FIGS. 6 and 7. In contrast to the first exemplary embodiment, the respective plug-in contact distributor 26 comprises a first supply line connection 48 and a second supply line connection 49. The supply line 27 of a first plug-in contact distributor 26 is connected to the power supply connection 41 of the central power supply 40 by means of the supply line contact plug 28 and connected to the supply line connection 48 by means of a further supply line contact plug 50. The supply lines 27 of the further plug-in contact distributors 26 are respectively connected to the supply line connection 48 and the supply line connection 49 of the preceding plug-in contact distributor 26. The respective supply line 27 is releasably connected to the associated plug-in contact distributor 26 and the adjacent plug-in contact distributor 26. In an exemplary embodiment which is not illustrated, the supply line 27 can be fixedly connected to the associated plug-in contact distributor 26 and releasably connected to the adjacent plug-in contact distributor 26. Therefore, the supply line 27 of a first heating apparatus 20 is connected to the power supply connection 41 of a central power supply 40, and the supply lines 27 of further heating apparatuses 20 are respectively connected to the plug-in contact distributor 26 of the previous heating apparatus 20 and therefore to the central power supply 40. As a result, the complexity for power supply to the heating apparatuses 20 can be reduced.

The respective switching element 42 comprises a current measurement sensor 50 for monitoring the connected heating elements 23. The current measurement sensor 50 is illustrated only in one of the switching elements 42 in FIG. 7 for reasons of clarity. The measurement values of the respective current measurement sensor 50 are transmitted to the control unit 47 by means of the data bus. The measurement values are evaluated in the control unit 47, so that the functioning of the heating elements 23 can be monitored and the threat of failure of a heating element 23 can be identified at an early stage.

Figure 8:
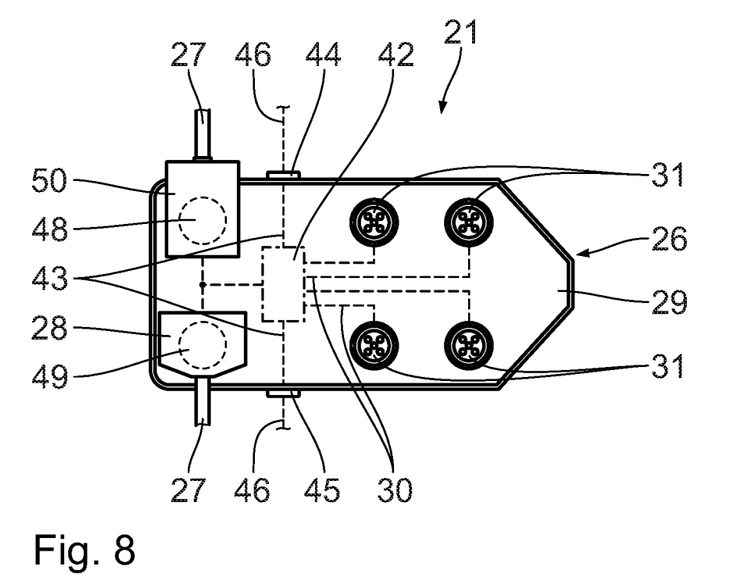
FIG. 8 shows a plan view of a supply unit of a heating apparatus according to a third exemplary embodiment.

A third exemplary embodiment of the invention is described below with reference to FIG. 8. In contrast to the exemplary embodiments above, the heating apparatus 20 comprises a central switching element 42. The switching element 42 serves to switch on and switch off all of the heating elements 23 which are connected to the plug-in contacts 31. The switching element 42 is controlled by means of the data bus line 46.

What is claimed is:

1. A heating apparatus for at least one housing section of a screw extruder, comprising
at least two electrical heating elements,
at least two electrical connection lines which are each connected to one of the at least two electrical heating elements,
an electrical supply line for supplying power to the at least two electrical heating elements via the at least two connection lines,
at least one switching element for switching at least one of the at least two electrical heating elements,
wherein the supply line is connected to a plug-in contact distributor,
wherein the plug-in contact distributor comprises at least two plug-in contacts,
wherein the at least two connection lines are each connected to one of the at least two plug-in contacts by means of a contact plug,
wherein the at least one switching element is integrated into the plug-in contact distributor, and
wherein the at least one switching element is connected to at least one data bus connection for actuation by means of a data bus line.

2. The heating apparatus according to claim 1, wherein the at least two connection lines are of flexible design.

3. The heating apparatus according to claim 1, wherein the at least two connection lines are fixedly connected to the associated contact plug.

4. The heating apparatus according to claim 1, wherein the plug-in contact distributor comprises at least four plug-in contacts.

5. The heating apparatus according to claim 1, wherein the electrical supply line is fixedly connected to the plug-in contact distributor.

6. The heating apparatus according to claim 1, wherein the electrical supply line is of flexible design.

7. The heating apparatus according to claim 1, wherein the at least two plug-in contacts and the respectively associated contact plug are mechanically and electrically connected to one another.

8. The heating apparatus according to claim 1, wherein the plug-in contact distributor and the supply line form a supply unit.

9. The heating apparatus according to claim 1, wherein the respective electrical heating element together with the associated electrical connection line and the associated contact plug form a heating unit.

10. The heating apparatus according to claim 1, wherein at least one of the plug-in contact distributor, the respective contact plug, the supply unit and the respective heating unit is at least of protection class IP54 according to standard DIN EN 60529.

11. The heating apparatus according to claim 1, wherein at least one of the plug-in contact distributor, the respective contact plug, the supply unit and the respective heating unit is at least of protection class IP64 according to standard DIN EN 60529.

12. The heating apparatus according to claim 1, wherein at least one of the plug-in contact distributor, the respective contact plug, the supply unit and the respective heating unit is at least of protection class IP67 according to standard DIN EN 60529.

13. The heating apparatus according to claim 1, comprising at least one measurement sensor for monitoring at least one electrical heating element.

14. The heating apparatus according to claim 1, wherein the plug-in contact distributor comprises at least one supply line connection.

15. A screw extruder comprising
a housing having at least two housing sections,
at least one housing bore which is formed in the housing,
at least one treatment element shaft which is rotatably arranged in the housing bore, and
at least one heating apparatus for at least one housing section of the screw extruder, comprising
at least two electrical heating elements,
at least two electrical connection lines which are each connected to one of the at least two electrical heating elements,
an electrical supply line for supplying power to the at least two electrical heating elements via the at least two connection lines, wherein the supply line is connected to a plug-in contact distributor,
at least one switching element for switching at least one of the at least two electrical heating elements,
wherein the plug-in contact distributor comprises at least two plug-in contacts,
wherein the at least two connection lines are each connected to one of the at least two plug-in contacts by means of a contact plug,
wherein the at least one switching element is integrated into the plug-in contact distributor,
wherein the at least one switching element is connected to at least one data bus connection for actuation by means of a data bus line, and
wherein the at least two electrical heating elements are arranged in receiving recesses of at least one of the housing sections.

16. The screw extruder according to claim 15, wherein at least one thermally insulating hood is arranged on at least one of the housing sections.

17. The screw extruder according to claim 16, wherein the at least one thermally insulating hood is of at least one of U-shaped and on-piece design.

18. The screw extruder according to claim 16, wherein a gap (S) is formed between the at least one thermally insulating hood and the housing, wherein the at least two connection lines are guided to the plug-in contact distributor through the gap (S).

19. A method for servicing a heating apparatus, comprising the steps of:
providing a heating apparatus for at least one housing section of a screw extruder, comprising
at least two electrical heating elements,
at least two electrical connection lines which are each connected to one of the at least two electrical heating elements,
an electrical supply line for supplying power to the at least two electrical heating elements via the at least two connection lines,
at least one switching element for switching at least one of the at least two electrical heating elements,
wherein the supply line is connected to a plug-in contact distributor,
wherein the plug-in contact distributor comprises at least two plug-in contacts,
wherein the at least two connection lines are each connected to one of the at least two plug-in contacts by means of a contact plug,
wherein the at least one switching element is integrated into the plug-in contact distributor, and wherein the at least one switching element is connected to at least one data bus connection for actuation by means of a data bus line,
switching off a first heating element by means of the at least one switching element and the at least one data bus connection,
disconnecting the contact plug which is associated with the first heating element from the plug-in contact of the plug-in contact distributor,
replacing the first heating element with a second heating element,
connecting the contact plug which is associated with the second heating element to a plug-in contact of the plug-in contact distributor, and
switching on the second heating element by means of the at least one switching element and the at least one data bus connection.

20. The heating apparatus according to claim 1, wherein the at least one switching element is designed as an active switching element and is supplied with electrical power via the electrical supply line.

21. The heating apparatus according to claim 1, wherein the at least one switching element comprises one switching element for each electrical heating element.

22. The heating apparatus according to claim 1, wherein the at least one switching element comprises one switching element for a plurality of electrical heating elements.

23. The heating apparatus according to claim 1, wherein the at least one switching element is connected to a first data bus line which is integrated in the plug-in contact distributor and connected to the data bus connection.

24. The heating apparatus according to claim 1, comprising a second data bus line for connecting the data bus connection with at least one of a control unit and a further plug-in contact distributor of a further heating apparatus.

25. The screw extruder according to claim 15, comprising a first heating apparatus for a first housing section and a second heating apparatus for a second housing section,
wherein a first switching element is integrated into a first plug-in contact distributor of the first heating apparatus and a second switching element is integrated into a second plug-in contact distributor of the second heating apparatus,
wherein the first switching element and the second switching element are connected to data bus connections by means of first data bus lines, and
wherein the data bus connections of the first plug-in contact distributor and the second plug-in contact distributor are connected by means of a second data bus line.

26. The screw extruder according to claim 25, comprising a control unit, wherein the second data bus line is connected to the control unit.